(12) United States Patent
Moussa

(10) Patent No.: US 8,833,945 B2
(45) Date of Patent: Sep. 16, 2014

(54) SPECKLE REDUCER AND PROJECTION UNIT INCLUDING A SPECKLE REDUCER

(75) Inventor: Hassan Moussa, Illkirch (FR)

(73) Assignee: Delphi Technologies, Inc., Troy, MI (US)

(*) Notice: Subject to any disclaimer, the term of this patent is extended or adjusted under 35 U.S.C. 154(b) by 196 days.

(21) Appl. No.: 13/640,684

(22) PCT Filed: Apr. 27, 2011

(86) PCT No.: PCT/EP2011/056681
§ 371 (c)(1),
(2), (4) Date: Oct. 11, 2012

(87) PCT Pub. No.: WO2011/135008
PCT Pub. Date: Nov. 3, 2011

(65) Prior Publication Data
US 2013/0027673 A1    Jan. 31, 2013

(30) Foreign Application Priority Data

Apr. 28, 2010 (FR) .................................... 10 53271

(51) Int. Cl.
*G03B 21/28* (2006.01)
*G02B 27/28* (2006.01)
*G02B 7/00* (2006.01)
*G02F 1/01* (2006.01)
*G02B 27/48* (2006.01)

(52) U.S. Cl.
CPC ............ *G02B 27/48* (2013.01); *G02B 7/008* (2013.01); *G02F 1/0147* (2013.01)
USPC ............................ 353/46; 353/121; 353/85

(58) Field of Classification Search
USPC ...................................... 353/46, 38, 121, 122
See application file for complete search history.

(56) References Cited

U.S. PATENT DOCUMENTS

| 6,577,429 | B1 | 6/2003 | Kurtz et al. | |
|---|---|---|---|---|
| 7,489,714 | B2* | 2/2009 | Park et al. | 372/20 |
| 7,905,608 | B2* | 3/2011 | Sumiyama et al. | 353/85 |
| 8,038,306 | B2* | 10/2011 | Sumiyama et al. | 353/85 |
| 8,500,287 | B2* | 8/2013 | Moussa | 353/38 |
| 2001/0007510 | A1 | 7/2001 | Dorsel et al. | |
| 2007/0058135 | A1 | 3/2007 | Morikawa et al. | |
| 2009/0016390 | A1 | 1/2009 | Sumiyama et al. | |
| 2010/0118535 | A1* | 5/2010 | Kusukame et al. | 362/259 |
| 2011/0128734 | A1* | 6/2011 | Sumiyama et al. | 362/235 |

OTHER PUBLICATIONS

International Search Report dated Jul. 4, 2011.

* cited by examiner

*Primary Examiner* — William C Dowling
(74) *Attorney, Agent, or Firm* — Lawrence D. Hazelton

(57) ABSTRACT

The present speckle reduction device comprises an optical element intended to be passed through by the coherent light beam to be treated. It also includes means able to cause heating of the said optical element; and a cooling element coupled to the said optical element so as to be able to cool the latter. A control module is configured to control the heating means and the cooling element so as to create thermal perturbations in the optical element, causing corresponding variations in the refractive index of the said optical element. The optical element is a piezoelectric crystal which is excited in a specific deformation mode causing its heating.

14 Claims, 3 Drawing Sheets

Section A-A

US 8,833,945 B2

SPECKLE REDUCER AND PROJECTION UNIT INCLUDING A SPECKLE REDUCER

CROSS-REFERENCE TO RELATED APPLICATION

This application claims the benefit under 35 U.S.C. §371 of published PCT Patent Application Number PCT/EP 2011/056681, filed Apr. 27, 2011, claiming priority to French patent application number FR1053271 filed on Apr. 28, 2010, and published as WO2011/135008 on Nov. 3, 2011, the entire contents of which is hereby incorporated by reference herein.

TECHNICAL FIELD OF INVENTION

The present invention relates to a speckle reduction device and the application of this to projection units using coherent light sources, in particular of the head-up display type for motor vehicles.

BACKGROUND OF INVENTION

A head-up display device typically comprises a projection unit which produces a light beam intended to be directed towards a combiner for the projection of images, in particular operating information of the vehicle or more generally relating to driving in the form of a virtual image situated in the field of view of the driver.

A troublesome phenomenon, which occurs in such head-up display devices or more generally in any type of projection system employing a coherent light source such as a laser, is known by the English term "speckle". The term speckle being also currently used in the field in French, although "tavelures [marks]", "chatoiement [sparkling]", or again laser granularity are also spoken of.

The particular spatial and temporal coherence properties of laser light are at the origin of the speckle phenomenon. After diffusion by a naturally rough surface, the coherent light waves emitted by a laser source interfere constructively at certain points in space and destructively at others; the light spots formed are as a whole called a speckle pattern and exist in all space in which waves diffused by the surface are superimposed.

The speckle phenomenon is used in certain cases to measure the deformation of objects. However, in many applications, and in particular in projection systems using diffractive elements, the speckle phenomenon is troublesome and it is important to reduce it in order to improve the quality of the image perceived by the user.

A number of solutions have been proposed to reduce speckle, most based on the averaging of the radiation phase by placing optical elements in motion. For example, rotary diffuser systems are known. Or again, translating and/or tipping diffusers or minors, which can be moved by means of actuators or piezoelectric motors. The documents EP-A1-1 510 851 and EP-A1-1 655 636 describe this type of solution.

It will be noted that, as is moreover described in these above-mentioned patent applications, the translatory and above all rotary systems are bulky, require strict movement control and can present problems of user comfort and robustness. The bulk of the traditional speckle reduction systems are such that it limits their application in certain miniaturized optical designs.

The document US 2009/016390 describes a system with speckle reduction comprising a light emitting unit associated with a wavelength selection element the principle of which is to have a plurality of light emitters that emit at slightly different wavelengths to reduce coherence and therefore speckle. Peltier elements allow it to be ensured that each of the regions of the device emits well at the required frequency. Distortions can be introduced by means of heat generating elements of piezoelectric type used as actuators, in place of the Peltier elements.

US 2001/007510 describes a speckle reducer comprising a projection surface with diffusing particles in suspension in a fluid and in constant relative motion. The fluid can be heated with resistances or be agitated by means of a piezoelectric actuator.

In similar manner, document US 2007/058135 presents a system that comprises an electrophoretic diffuser that changes the phase of the rays, and is based on agitation of particles in suspension.

SUMMARY OF THE INVENTION

The object of the present invention is to propose an improved speckle reduction system for a coherent light beam, not having the disadvantages of the known translatory and rotary systems.

In accordance with the invention, this objective is attained by a speckle reduction device for a coherent light beam comprising: an optical element intended to be passed through by the coherent light beam to be treated; means able to cause the heating of the said optical element; a cooling element coupled to the said optical element so as to be able to cool the latter; a control module configured to control the heating means and the cooling element so as to create thermal perturbations in the optical element, causing corresponding variations in the refractive index of the said optical element.

In accordance with one aspect of the invention, the optical element passed through by the light ray to be treated is a piezoelectric crystal, and at least one vibratory mode of the crystal is excited so as to cause its heating. In this context, it will be appreciated that a piezoelectric crystal is preferably used biased in the vibratory mode known as "thickness-shear" of the crystal (it should be noted that this is in fact a mode of infinitesimal deformation—which does not cause apparent vibrations and which cannot be used for actuation). In this case, the heating means advantageously comprise electrodes applied to the crystal and connected to the control module so as to be able to excite the required vibratory mode.

Thus, contrarily to the speckle reduction systems based on rotation or translation of a diffuser, the device in accordance with the present invention proposes attenuation of the speckle phenomenon by variation of the refractive index of an optical element passed through by the coherent light beam to be treated. The speckle reduction principle employed is therefore based on a variation of an intrinsic property of the optical element and not on the displacement of a diffuser.

It will be appreciated that the variation in the refractive index results from thermal perturbations deliberately caused in the optical element. In fact, as is known, the refractive index of the medium is also dependent on the temperature of this medium. In other words, the present invention exploits a variation in the refractive index of a transparent optical element by causing variation in the temperature of the latter from an initial temperature (e.g. 25° C.).

The temperature variations are generated by the combined use of the heating means and of the cooling element, which permit the creation of controlled temperature variations in the optical element. The controller is advantageously configured to create random or pseudo-random thermal perturbations.

The variations in the refractive index of the optical element cause phase variations in the light beam that passes through it, and which, with suitable control of the frequency and amplitude of the thermal perturbations, result in a compensation or averaging effect for the human eye, and therefore speckle reduction. To this end, the control module is advantageously configured to generate thermal perturbations that result in variations in the refractive index at a frequency higher than the sensitivity of the human eye (retinal perception).

To implement the present invention, the material selected for the optical element should essentially be transparent at the wavelengths of the light beam to be treated and its refractive index should present a detectable variation within the required range of operating temperatures in order to observe the required phenomenon. Preferably, the variation in the refractive index is of the order of at least 15% (absolute value) between 20° C. and 125° C., preferably of the order of 30%.

The means for heating the optical element can for example also comprise one or more resistive heating elements applied to it.

For improved control, the device advantageously includes means for determining the temperature of the optical element. One possibility consists of measuring the temperature with a thermocouple or other suitable device. However, when the transparent element is a piezoelectric crystal, the temperature of the crystal can be determined by means of the thermoelastic coupling of the quartz, and therefore by measuring the actual oscillation frequency of the crystal.

Preferably, the optical element is held by a metallic fixing support, which also ensures thermal coupling with the cooling element.

The cooling element can comprise a Peltier element preferably associated with a heat dissipater. A Peltier element is advantageous for its control and integration facility in miniaturized devices.

As will have been understood, the present speckle reduction device finds a principal application in the projection units using coherent light sources. And an additional application is therefore the field of head-up display devices including a projection unit provided with the present speckle reduction device.

It will also be noted that the absence of rotation or translation mechanism in the present device in accordance with the invention allows extreme miniaturization, the size of the device being able to attain a dimension of the order of 200 µm. It is consequently possible to integrate the present speckle reduction device directly in a coherent light source such as a laser, the optical element being able for example to form the output window of the source.

In this case of integration in the light source, the optical element has a treatment zone passed through by the coherent light beam suited to the diameter of this beam; this treatment zone can for example have a diameter of the order of 200 µm. The optical element can then be used as an output window after the light generation element (for example of the semiconductor type) or frequency-doubling crystals, where appropriate. The optical element can be thermally coupled to a Peltier element mounted externally to the case of the light source.

In accordance with another aspect, the present invention also relates to a method for speckle reduction in which a coherent light beam to be treated passes through an optical element, characterized by the fact that this optical element is associated with heating means and with a cooling element and by the fact that thermal perturbations are created in this optical element so as to cause its refractive index to vary.

Preferably, the thermal perturbations are created in random or pseudo-random manner. The resulting variations in the refractive index advantageously have a frequency higher than the sensitivity of the human eye.

In accordance with an alternative embodiment, the optical element is a piezoelectric crystal biased in a vibratory mode causing its heating, preferably the thickness-shear mode.

In accordance with another alternative embodiment, the heating means comprise one or more resistive electrodes affixed to the optical element.

BRIEF DESCRIPTION OF DRAWINGS

Other features and characteristics of the invention will become apparent from the detailed description of some advantageous embodiments presented below, by way of illustration, with reference to the attached drawings. These show.

DETAILED DESCRIPTION

The present speckle reduction device is based on speckle reduction by a phase variation of the light rays obtained by a variation in the refractive index of an optical element through which the coherent light beam to be treated passes, the said variation being obtained by thermal perturbations caused in this optical element.

It is known that the speed of propagation (v) of a wave in a medium of refractive index n is given by the relationship: $v=c/n$, c being the speed of light in a vacuum. The phase velocity of a wave therefore depends on the refractive index of the medium in which this wave is propagated. It is moreover known that the refractive index of a medium depends, more or less responsively, on temperature.

The present device therefore exploits this relationship between refractive index and temperature to cause controlled phase variations in the radiation passing through it, the variations being so generated as to cause an averaging of phase in the eye of the user, attenuating speckle effect.

Figure 1:
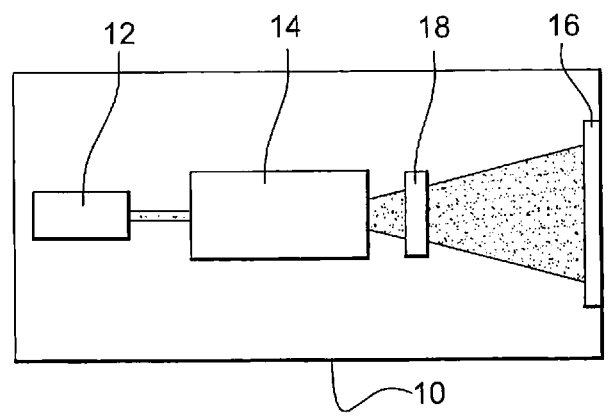
FIG. 1: a basic diagram showing a projection unit including the present speckle reduction device.

FIG. 1 shows an example of a projection unit 10 which, in a conventional configuration, comprises a coherent light source 12, such as for example a laser, an optical unit for shaping the laser beam 14 (diffractive or otherwise) and a display 16.

A speckle reduction device 18 is placed in the path of the coherent light beam between the source 12 and the display 16, here after the optical unit for shaping the beam 14.

Figure 2:
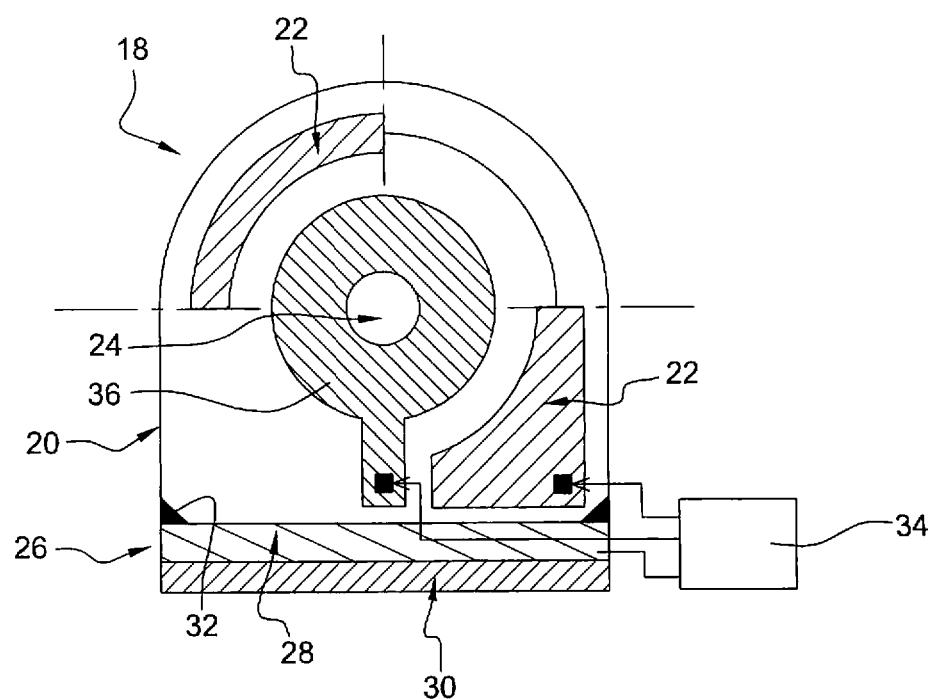
FIG. 2: a diagram of a speckle reduction device using resistive electrodes.
Figure 3:
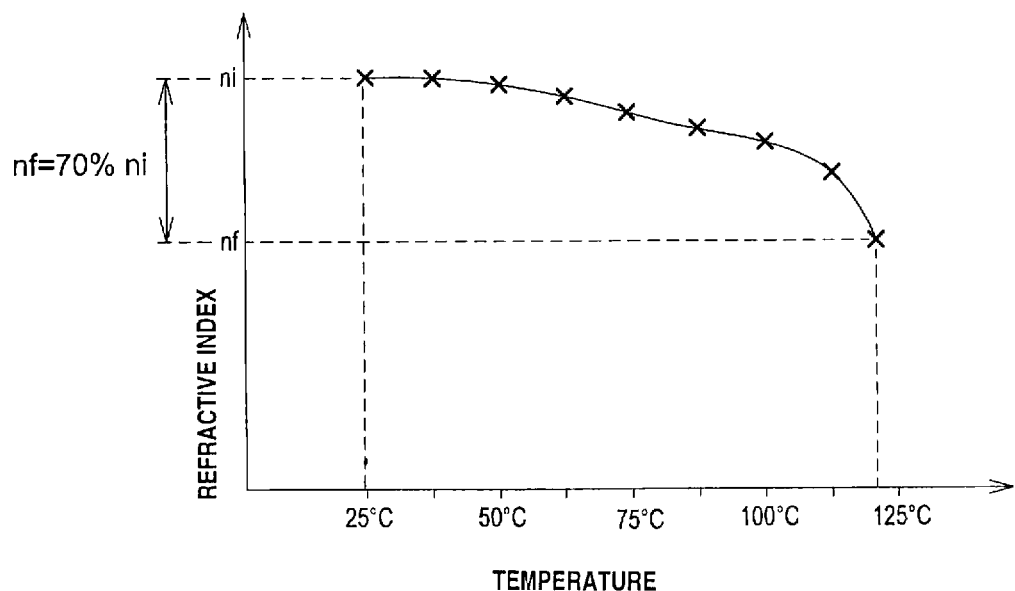
FIG. 3: a graph showing the variation in the refractive index of a quartz crystal as a function of temperature.

An embodiment of the speckle reduction device 18 is shown in detail in FIG. 2. It comprises an optical element 20 intended to be passed through by the laser beam to be treated. In the present alternative embodiment, this optical element 20 is a quartz crystal. In accordance with the present invention, it is the variability in the refractive index of the quartz crystal 20 as a function of temperature that is exploited to reduce speckle. This variability is illustrated by the curve of FIG. 3. As can be seen, the heating of a quartz crystal from 25 to 125° C. causes a reduction of 30% in the refractive index of the crystal.

In FIG. 2, the reference mark 22 indicates two resistive electrodes (e.g. made of platinum) affixed to the front face of the crystal 20, connected to each other, which permit the heating of the crystal so as to cause its refractive index to vary. These electrodes are preferably arranged in a non-symmetrical configuration, so as to create a non-uniform distribution of temperature in the crystal 20.

In view of the configurations selected, the present device 18 must be so arranged that the light beam to be treated passes through the central part 24 of the quartz crystal 20, which forms an optical treatment path.

A cooling element 26 is associated with the crystal 20 so as to be able to selectively extract heat from the crystal 20 and modify its temperature. Preferably, the cooling element 26 comprises a Peltier element 28 placed against a heat dissipater 30. The operating principle of a Peltier element itself being known, it will not be described here. The thermal coupling between the cooling element 26 and the crystal 20 is effected through a metallic fixing support 32 of the crystal. The base of the crystal 20 can be in direct contact with the Peltier element 28.

Lastly, the device 18 is controlled by a control module 34 that controls the heating electrodes 22 as well as the cooling element 26. As explained, the control module 34 combines the heating and cooling effects to cause temperature variations in the crystal and cause its refractive index to vary.

For optimal control of the temperature variations, it is desirable to determine the temperature of the crystal in the proximity of the treatment zone 24. Although that can be done by conventional temperature measurement, it will be preferred to deduce it from the oscillation frequency of the piezoelectric crystal. To this end, an electrode 36 is fixed to the front face of the crystal, a symmetrical electrode (not shown) being fixed to the opposite face, and the control module 34 includes an oscillator circuit. The application of an electrostatic field to one of these electrodes 36 permits generation of the frequencies due to the electrostatic field and to the weight of the electrodes (the frequencies preferably being those for excitation known as "thickness-shear"). The detection of these frequencies by the electrode on the opposite face permits, using the frequency-temperature coefficient of the material used (i.e. quartz for the cut used), determination of the temperature of the crystal.

Thus, measurement of the oscillation frequency of the quartz by means of the electrodes 36 permits determination of the temperature of the crystal 20, knowing that with the crystal configuration as presented above the frequency variation is estimated of the order of 500 Hz/° C.

Figure 6:
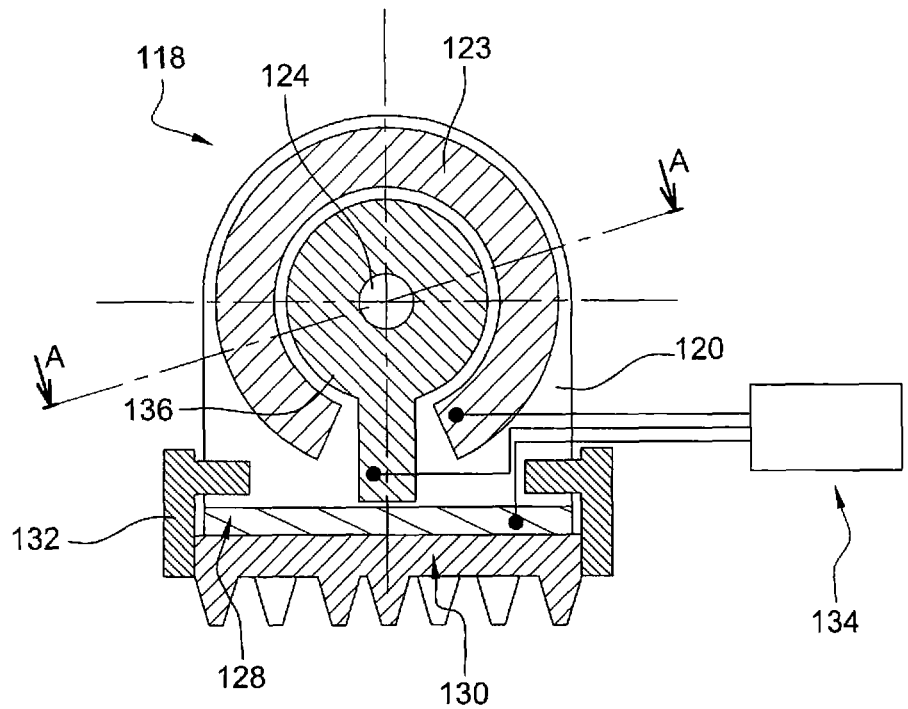
FIG. 6: a diagram of a preferred embodiment of the present speckle reduction device.

It will moreover be noted that heating of a piezoelectric crystal can only be effected by exciting a vibratory mode of the latter. Such an embodiment is shown in FIG. 6; identical or similar elements to those of FIG. 1 are indicated by the same reference marks, increased by 100. Instead of the resistive electrodes 22, two exciting electrodes 123 are arranged symmetrically on the two faces of the quartz crystal 120. The central part 124 of the crystal 120 constitutes the optical treatment path through which the light beam to be treated must pass.

As for the device of FIG. 1, a cooling element 126 is associated with the crystal 120 so as to be able to selectively extract heat from the crystal 120 and modify its temperature. Preferably, the cooling element 126 comprises a Peltier element 28 affixed to a heat dissipater 130. The thermal coupling between the cooling element 126 and the crystal 120 is effected through a metallic fixing support 132 of the crystal. The base of the crystal 120 can be in direct contact with the Peltier element 128.

The control module 134 manages the combination of the heating and cooling effects to cause temperature variations in the crystal and cause its refractive index to vary.

For the exciting electrodes 123 are preferably used electrodes of generally annular form, made of gold or silver; these electrodes are controlled by an oscillator circuit integrated in the control module 134. For measuring the temperature, the same central electrodes 136 are retained.

As shown in FIGS. 1 and 6, in practice, the elements to be applied to the optical element, such as exciting electrodes, resistive and/or temperature detecting, are preferably positioned on the periphery of the treatment zone 24 of the optical element. The dimension (area) of this treatment zone is of course suited to the diameter of the beam to be treated.

Figure 5:
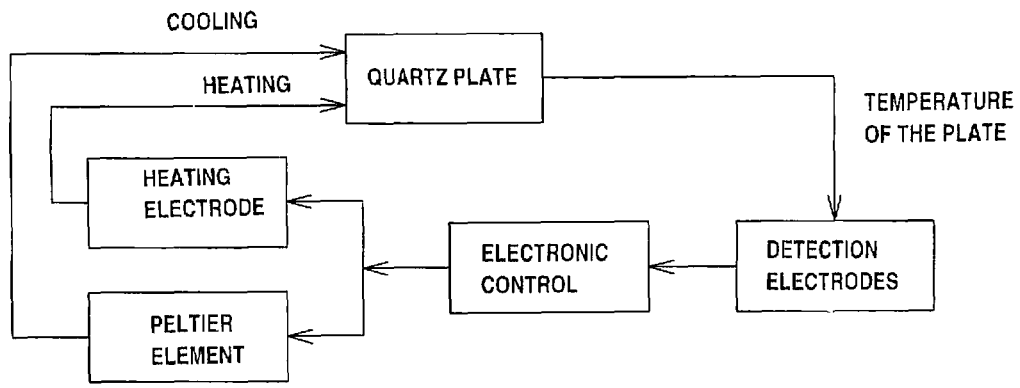
FIG. 5: a basic diagram of the operation of the speckle reduction device of FIG. 1.

The general operating principle of the present device 18, 118 is illustrated in FIG. 5. The control module controls the heating electrodes 22 and the exciting electrodes 123 respectively, and the cooling unit 26, 126 so as to cause controlled temperature variations in the crystal 20, 120. The control module 34, 134 also controls the electrodes 36, 136 in order to determine the temperature of the crystal 20, 120, and consequently control the heating/cooling cycle.

Figure 4:
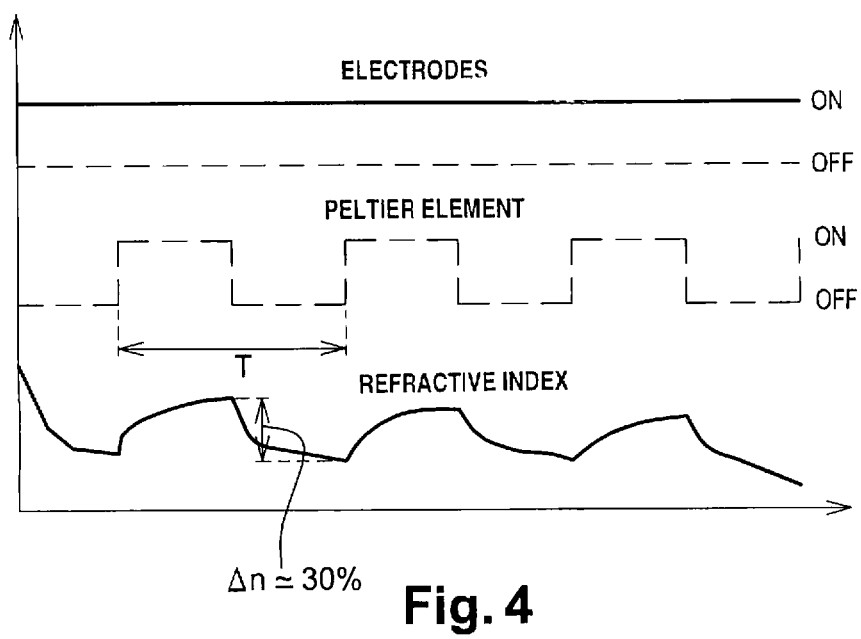
FIG. 4: a graph showing diagrammatically the state of operation of the electrodes and of the cooling element and the corresponding variations in the refractive index as a function of time.

A preferred control scenario of the device is illustrated in FIG. 4. As shown, the crystal is permanently heated via the electrodes 22, 123 respectively. The cooling element 26, 126 is for its part temporarily activated, counteracting the heating caused by the vibratory mode. By controlling the run and stop durations of the Peltier element 28, 128 in suitable manner, variations of determined amplitude and frequency are generated in the refractive index in the quartz crystal 20, 120.

Preferably, the control module produces random or pseudo-random variations in the refractive index, and this at frequencies higher than or equal to the frequency of visual perception. An effect of phase averaging of the coherent beam in the eye of the user is thus obtained.

For this purpose, the Peltier element 28, 128 is here controlled at a frequency of at least 50 Hz, which involves for the crystal an alternation of at least 50 rising and falling edges of the refractive index per second. Generally, it will be possible to work at frequencies of the order of 100 to 5000 Hz.

Moreover, for a responsive effect, a temperature range will be used preferably causing a variation of at least 15% to 20% (absolute value), in more preferred manner of at least 30% of the refractive index between the minimum temperature of a period and the maximum temperature. The temperature of the crystal is therefore here caused to vary from ambient to more than 100° C. in each period. In accordance with one embodiment, the selected piezoelectric crystal presents a variation in refractive index of the order of 10 to 25%, in particular of 15 to 20%, over a range of temperatures of an amplitude of the order of 40° C. to 50° C., i.e. from ambient to approximately 60° C.

The general operating principle being given, it remains to provide some preferred details of execution.

The crystal 20, 120 preferably has the form of a plate of small thickness, preferably tending towards an infinite plate, and which is cut to function in the vibration/deformation mode known as "thickness-shear". Infinite plate means a plate of which the thickness is small relative to its extension in the plane of the plate, resulting in a diameter (or length) over thickness ratio preferably greater than 10. For example, the crystal 20, 120 can have a plate form having a diameter (or length) over thickness ratio greater than 10 or 15. It is this vibratory (or infinitesimal deformation) "thickness-shear" mode which is used in the two alternative embodiments above, and therefore for temperature measurement but also to obtain the heating of the crystal for the device 118.

It will therefore be possible to use a quartz monocrystal cut in a single-rotated cut, conventionally called γ+θ. As is known, the thermal properties of the quartz depend on its angle of cut, even if the relationships remain empirical. For an application in the present device, the cut can vary within the range between the cut known as AT and the cut known as BT, which signifies for θ: −49°=θ=35.

For operation within a temperature range of −30° C. to approximately 160° C., the angle θ can in particular be within the interval 4 to 24°, a particularly preferred value being approximately 14°.

This cut of the quartz crystal results in resonance frequencies of some MHz to some hundreds of MHz, typically between 1 MHz and 500 MHz.

It will have been understood that the piezoelectric effect is used in the alternative embodiment of FIG. 1 to detect the heating caused in the crystal; while in the alternative embodiment of FIG. 6 the piezoelectric effect is also used to heat the crystal so as to cause a required variation in the refractive index. High vibratory frequencies are exploited in a vibration mode that is not normally intended for actuation. The deformation of the crystal is of the order of some nm and is therefore not observable on the macroscopic scale. Thus, the present device, although using the piezoelectric effect, can be considered as static (or quasi-static), as opposed to the speckle reduction systems using rotational or translatory mechanisms.

Conventionally, the cut of the crystal is produced after measurement of the angle θ by x-ray diffraction, then the piece of quartz obtained is polished.

To produce the electrodes, the processes could be applied which are conventionally used in the manufacture of Quartz resonators. In accordance with a modified embodiment, on each face and under vacuum are successively deposited a layer of chromium and then a layer of gold. For the resistive electrode, platinum can be used.

Figure 7:
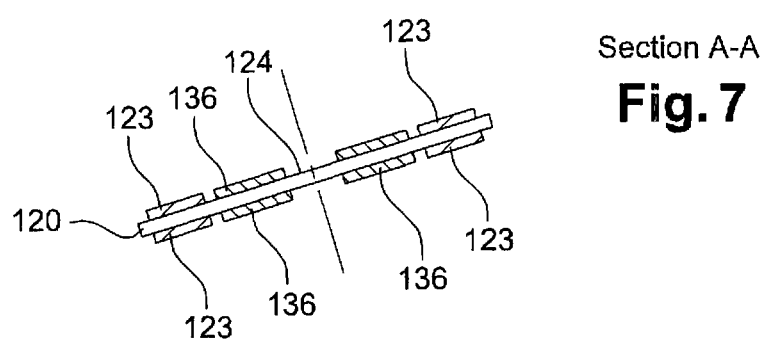
FIG. 7: a view in section A-A of the speckle reduction device of FIG. 6.

It will be noted that in the alternative embodiment of FIG. 6, the electrodes 123 and 136 are so selected as to cover almost the whole of each of the faces of the quartz plate (with the exception of the zone of passage of the light 124). For example, on one face of the crystal 120, the ratio between the area of the electrodes and the area of the plate 120 (without the central zone 124) is preferably greater than 0.6. The electrodes 123 and 136 are deposited symmetrically on the two faces of the plate, as can be seen in FIG. 7.

The weight of the electrodes 123 and 136 participates in causing deformations in the thicknesses (thickness-shear deformation).

The forms of the electrodes are then produced by photolithography. A layer of photosensitive resin is applied to the two faces. Two photomasks having apertures corresponding to the forms of the electrodes are positioned on either side of the crystal. And the two faces of the crystal are exposed simultaneously to UV through the photomasks so as to polymerise the exposed portions of resin, and this allows high precision to be obtained in the relative positioning of the electrodes.

The non-polymerized resin is removed, and the chromium and gold unprotected by the non-polymerized layer of resin are then removed by a suitable chemical solution. Lastly, the remaining resin is removed, leaving the electrodes.

At the level of control, the control module comprises an oscillator circuit connected to the electrodes 36, 136 and which controls the quartz resonator 20, 120. It is considered that the annular form of the electrodes 36, 136 or else the electrodes 123 permits optimal excitation of the thickness-shear mode.

Lastly, although the present alternative embodiment uses a quartz crystal, it is clear that the man skilled in the art will be able to implement the present invention with other crystals having suitable optical and piezoelectric properties. In particular, berlinite ($AlPO_4$) could for example be used.

The invention claimed is:

1. A speckle reduction device for a coherent light beam comprising:
   an optical element configured to be passed through by the coherent light beam to be treated, characterised by: for speckle reduction of the coherent light beam;
   a heating means configured to heat said optical element;
   a cooling element coupled to said optical element in a manner effective to cool the optical element; and
   a control module configured to control the heating means and the cooling element in a manner effective to create random or pseudo-random thermal perturbations in the optical element, thereby causing corresponding variations in the refractive index of the said optical element, wherein said optical element is a piezoelectric crystal, and the heating means comprise electrodes applied to the crystal and connected to the control module to excite a vibratory mode of the crystal causing its heating.

2. The speckle reduction device as described in claim 1, wherein the thermal perturbations are performed so that the refractive index varies at a frequency higher than 50 Hz.

3. The speckle reduction device as described in claim 1, wherein the optical element (20, 120) is made of a material essentially transparent to the wavelengths of the beam to be treated and the refractive index of which varies with temperature.

4. The speckle reduction device as described in claim 1, wherein the piezoelectric crystal is of quartz or of berlinite.

5. The speckle reduction device as described in claim 1, wherein the control module is configured to excite the thickness-shear mode of the piezoelectric crystal.

6. The speckle reduction device as described in claim 1, wherein the heating means comprise one or more resistive heating elements applied to the optical element.

7. The speckle reduction device as described in claim 1, wherein said device includes a measuring means for measuring the oscillation frequency of the crystal and determining the temperature of the crystal on the basis of this.

8. The speckle reduction device as described in claim 1, wherein the cooling element comprises a Peltier element preferably associated with a heat dissipater.

9. The speckle reduction device as described in any one of the preceding claims, in which claim 1, wherein the crystal has an infinite plate form presenting a diameter, length respectively over thickness ratio greater than 10.

10. A projection unit including a speckle reduction device as described in claim 1.

11. A head-up display device including a projection unit equipped with a speckle reduction device as described in claim 1.

12. A coherent light source including a speckle reduction device as described in claim 1.

13. A method for speckle reduction of a coherent light beam, said method comprising:
   passing the coherent light beam through an optical element, characterised by the fact that the optical element includes a heating means and a cooling element; and creating thermal perturbations in random or pseudo-random manner in the optical element so as to cause a refractive index of the optical element to vary at a frequency higher than the sensitivity of the human eye wherein the optical element is a piezoelectric crystal, and, wherein the heating means includes electrodes applied to the crystal to excite a vibratory mode of the crystal causing its heating.

14. The method as described in claim 13, wherein the crystal is characterized as having an infinite plate form and the thickness-shear mode is excited.

* * * * *